United States Patent

Maier et al.

[11] Patent Number: 5,853,444
[45] Date of Patent: Dec. 29, 1998

[54] POROUS PERMEABLE MOLDED BODY

[75] Inventors: Horst R. Maier, Aachen; Uwe Schumacher, Stolberg; Walter Best; Wolfgang Schäfer, both of Düren, all of Germany

[73] Assignee: Thomas Josef Heimbach GmbH & Co., Germany

[21] Appl. No.: 821,871

[22] Filed: Mar. 21, 1997

[30] Foreign Application Priority Data

Mar. 23, 1996 [EP] European Pat. Off. ............ 96 104 647

[51] Int. Cl.$^6$ ............................ B01D 39/20; C04B 38/00
[52] U.S. Cl. ................. 55/523; 55/DIG. 5; 55/DIG. 30; 60/311
[58] Field of Search ............................... 55/523, DIG. 30, 55/283, 282, 269, DIG. 5; 60/311; 95/273, 288, 278

[56] References Cited

U.S. PATENT DOCUMENTS

| | | | |
|---|---|---|---|
| 4,505,107 | 3/1985 | Yamaguchi et al. | 55/DIG. 30 |
| 4,535,589 | 8/1985 | Yoshida et al. | 55/DIG. 30 |
| 4,744,216 | 5/1988 | Rao et al. | 55/DIG. 30 |
| 4,791,785 | 12/1988 | Hudson et al. | 55/DIG. 30 |
| 4,897,096 | 1/1990 | Pischinger et al. | 55/523 |
| 4,912,076 | 3/1990 | Mizrah et al. | 55/523 |
| 4,979,364 | 12/1990 | Fleck | 55/DIG. 30 |
| 5,087,272 | 2/1992 | Nixdorf | 55/523 |
| 5,423,904 | 6/1995 | Dagsgupta | 55/523 |
| 5,449,654 | 9/1995 | Prin et al. | 55/523 |
| 5,474,587 | 12/1995 | Dias et al. | 55/523 |

FOREIGN PATENT DOCUMENTS

| | | |
|---|---|---|
| 0336883 | 10/1989 | European Pat. Off. . |
| 3305529 | 8/1984 | Germany . |
| 4130630 | 12/1994 | Germany . |
| 4413127 | 10/1995 | Germany . |
| 9313303 | 7/1993 | WIPO . |

OTHER PUBLICATIONS

WPI/Derwent –AN –95 –157984 [21].

*Primary Examiner*—Duane S. Smith
*Attorney, Agent, or Firm*—Joseph W. Berenato, III

[57] ABSTRACT

A porous permeable molded body designed especially for use in the removal of diesel soot particles from the exhaust gas of diesel engines is disclosed. The body includes an alternatingly closed honeycombed body made of silicon carbide and possessing the following features:

| | |
|---|---|
| wall thickness: | 1.25 ± 0.5 mm; |
| porosity: | 55 to 60%; |
| average pore diameter: | 25 to 70 μm; |
| specific permeability: | 20 to 100 nPm. |

In the production method, a starting powder of silicon or a mixture of silicon with portions of silicon carbide and/or carbon is combined with an organic binding agent that can be coked and molded into a green body. This is then subjected to a coking fire in an inert-gas atmosphere; the molded body obtained in this manner is then heated in the presence of nitrogen or a nitrogenous inert gas to a temperature where free silicon is converted with the carbon, in a reaction firing, to silicon carbide. Additionally, a recrystallization firing at greater than 2000° C. is implemented.

5 Claims, No Drawings

POROUS PERMEABLE MOLDED BODY

BACKGROUND OF THE INVENTION

The invention relates to a porous, flow-through molded body, designed specifically for the removal of diesel soot particles from the exhaust gas of diesel engines. It is comprised of an alternately closed honeycombed body made of silicon carbide. The invention further relates to a method for producing this molded body, in which a starting powder of silicon or a mixture of silicon with portions of silicon carbide and/or carbon is combined with an organic binding agent that can be coked and is then molded. It is especially extruded into a green body which is then subjected to a coking treatment in an inert-gas atmosphere; the molded body obtained in this manner is then heated in the presence of nitrogen or an inert gas that contains nitrogen to such a temperature causing the free silicon to be converted with the carbon in a reaction into silicon carbide.

Molded ceramic bodies are gaining increasing importance as filter elements and as supporting material for catalysts, especially in applications involving the filtration of hot gases, because molded bodies of this kind are extraordinarily temperature-resistant. For this reason, their use in the removal of soot particles from the exhaust gas of diesel engines is of particular interest, as these soot particles are believed to produce cancerous effects.

The material silicon carbide has proven to be particularly well-suited for this purpose. It is chemically stable and demonstrates high temperature and thermal cycling resistance. Despite a large number of attempts, however, there continue to be difficulties in producing a molded body from this material that can fulfill all the necessary requirements. Various methods have been applied in these attempts.

In the process specified in DE-C-41 30 630, a starting powder is formed from silicon or from silicon and carbon and/or α-silicon carbide. This is combined with an organic binding agent that can be coked and a solvent, preferably water. A green body is formed, for example via extrusion, which is then carbonized in an inert-gas atmosphere or in a vacuum by heating it to a temperature between 600° and 1000° C. The molded body obtained in this manner is then subjected to a reaction firing at a temperature between 1400° and 2000° C. The silicon is thus converted with the carbon to β-silicon carbide.

For the application of these bodies with diesel engines it is important for the soot particles that are deposited on the molded body to be cleaned off at regular intervals. This way the flow resistance does not become too great. To achieve this, the soot particles are burned off by sufficiently heating the molded body via an electrical current. Silicon carbide, however, has a relatively high resistance, thus, high voltages would be required in order to heat the molded body to a sufficiently high temperature. For that reason, the electrical conductivity of the silicon carbide is manipulated by adding various substances to it, particularly nitrogen. In the above-described method, this is accomplished either by adding a suitable compound to the powder or by implementing the reaction firing in a nitrogen atmosphere or a nitrogenous atmosphere.

In its practical application, the above-described method has its limits. The pore structure that can be achieved via this method enables a satisfactory flow rate only when combined with extraordinarily narrow wall thicknesses of less than 1 mm. And such narrow wall thicknesses present difficulties even in the production of the green body. Even more serious is the factor that a molded body of this kind does not possess sufficient strength. And a molded body of this type would be exposed to considerable vibration if used in diesel engines.

In order to achieve flow-through properties that will fulfill the necessary requirements with sufficient strength, attempts have been made using a second variation on the above-described method. In this variation, first a granulate is formed. It is then molded into the green body via quasi-isostatic pressing. Disregarding the fact that this requires an additional step in the procedure, this results in wall thicknesses that are in the centimeter range. Although the wall thicknesses can be reduced via a machining process, for reasons of stability they can be reduced by only one-half at most. And even then the volume of ceramic building material per filter surface area is relatively great, particularly since only simple pipe geometries can be produced with this method. Added to this is the fact that the amount of energy required for the regeneration is high when the specific resistance is decreased via endowment with nitrogen. In addition, the supplementary machining of the molded body makes production more costly.

Another attempt is made with the method specified in EP-A-0 336 883. Insofar as silicon carbide molded bodies are recommended in that patent, primary silicon carbide powder, in the particle size range of 75 to 170 $\mu$m, is used as the starting material. The powder, combined with a binding agent, is molded into a green body which is then heated to a temperature between 1500° and 1900° C. in order to eliminate or temper the binding agent. This way the silicon carbide particles will be bonded together via an external phase.

With this method, as with the previous method, no satisfactory molded body can be produced. The thermal and chemical resistance are negatively affected by the external phase. A high degree of strength or electrical conductivity cannot be generated. In the sintering, a linear shrinkage of 15% or more usually occurs, with the result that the production of geometries that are dimensionally accurate and without deformation is difficult. In addition, the flow-through properties achieved with the use of relatively coarse SiC particles are unsatisfactory, unless in this case, as before, very narrow wall thicknesses, which cannot fulfill stability requirements, are used. On the other hand, the size of the silicon particles cannot be optionally increased as this will also result in stability problems. A further disadvantage consists in that silicon carbide powder is extraordinarily abrasive. This results in high levels of wear in preparation of the body, in its extrusion, and in any possible processing steps.

In the method specified in WO 93/13303, silicon carbide particles in a bimodal particle-size distribution of approximately 70% by weight oversize material, ranging in size between 35 and 125 $\mu$m, and approximately 4 to 13% undersize material, ranging in size between 0.3 and 2 $\mu$m are used as the starting material. Following the addition of a binding agent, a green body is molded and heated between 300° and 500° C. in order to burn off the binding agent. The molded body formed in this manner is then heated to a temperature that is greater than 2200° to 2600° C. in order to decompose the undersize material. The decomposition product settles out in all evaporation-condensation mechanism as a sublimate on the contact points of the coarse particles, thus creating stable bridges between these particles.

This method offers the advantage that no shrinkage occurs. Therefore, molded bodies with good flow-through properties and strength can be produced. The disadvantage of this method, however, is that extraordinarily high temperatures, in the range of 2500° C., are required for starting up the evaporation-condensation mechanism. This requires a correspondingly high expenditure of energy. In addition, the starting material generates high levels of wear in the body preparation, the extrusion of the molded body, and any possible machining steps. The undersize material required in every case is relatively expensive. And the bimodal particle distribution results in the danger of a "phase separation" in the production process.

SUMMARY OF THE INVENTION

The object of the invention is to prepare a molded body designed specifically for the removal of diesel soot particles that possesses optimal properties in terms of filter effectiveness, permeability, strength, and electrical resistance. The object further entails formulating a method by which a molded body of this type can be reproduced, and will permit low levels of wear in the production of the green body.

The first part of this object is attained according to the invention with a molded body comprised of a honeycombed body that is alternately closed at the ends, and that is characterized by the following features:

wall thickness 1.25±0.5 mm porosity 55 to 60%;

average pore diameter 25 to 70 μm;

specific permeability 20 to 100 nPm.

The present invention also provides a method for the production of a porous, permeable molded body made of silicon carbide, in which a starting powder of silicon, or a mixture of silicon with portions of silicon carbide and/or carbon, is combined with an organic binding agent that can be coked and is molded. Especially, it is extruded into a green body which is then subjected to a coking treatment in an inert-gas atmosphere. The molded body produced in this manner is then heated in the presence of nitrogen or an inert gas containing nitrogen to such a temperature causing the free silicon to be converted with the carbon in a reaction to form silicon carbide. This is characterized in that a recrystallization firing is performed at greater than 2000° C.

DESCRIPTION OF THE PREFERRED EMBODIMENTS

According to a preferred embodiment of the present invention, a porous, flow-through molded body is designed especially for the removal of diesel soot particles from the exhaust gas of diesel engines. The molded body is comprised of an alternatingly closed honeycombed body made of silicon carbide. It is characterized by the following features:

| | |
|---|---|
| wall thickness: | 1.25 ± 0.5 mm; |
| porosity: | 55 to 60%; |
| average pore diameter: | 25 to 70 μm; |
| specific permeability: | 20 to 100 nPm. |

In the above, an alternately closed honeycombed body refers to that which is described in FIGS. 5 and 6 of EP 0 336 883, and which is characterized in that honeycombed channels are designed to be alternately closed on the flow-in and the flow-off sides. This way gas that is to be cleaned must pass through the lateral channel walls. The molded body specified in the invention has a strength that is sufficient for the rough conditions on the diesel engine, while possessing high flow-through properties with low level of pressure loss.

In the development of the invention, it is provided that the specific electrical resistance r of the green molded body should be set in a specific range, preferably between $r_{min}$ and $r_{max}$ in correspondence with the following formula:

$$r_{min} = \frac{P_{set}}{I_{max}^2} \times \frac{A_q}{1}$$

$$r_{max} = \frac{U_{max}^2}{P_{set}} \times \frac{A_q}{1},$$

in which $P_{set}$ represents the required electrical heating capacity, $I_{max}$ represents the maximum tolerable current intensity, $U_{max}$ represents the maximum tolerable voltage, $A_q$ represents the current-carrying cross-sectional area of the molded body, and 1 represents the current-carrying length of the molded body, and in which $P_{set}$ is less than or equal to $U_{max} \times I_{max}$. In addition, the values for tolerable voltage and current intensity are understood as those values that should not or cannot be exceeded under current user-specific requirements. Preferably, the specific electrical resistance r of the molded body should lie between 0.1 and 3 ohm×cm.

For setting the electrical resistance, compounds and/or elements of the third and fifth main or B-group of the periodic table are well-suited. They can be added to the molded body. One element that may be used is boron, which should be contained in the molded body in a quantity of 0.05% to 1.0% by weight, with this quantity referring to the element boron itself, even when the boron is present in the form of a compound, for example boron carbide, a condition which is advantageous.

To enable the production of a molded body as specified above, a method is recommended, in accordance with the invention, that is based upon the method described first above, in accordance DE-C-41 30 630. In the method specified in the present invention, however, a recrystallization firing is implemented at greater than 2000° C., preferably between 2100° and 2300° C. The recrystallization firing results in definite pore growth, with the result that the flow-through properties are substantially improved. This means that the specific (material-related) flow-through properties, in comparison with the molded bodies produced in accordance with DE-C-41 30 630 (without granulate formation) are substantially greater and thus more favorable. In comparison with the molded bodies produced in accordance with WO93/13303, which must be produced with very narrow wall thicknesses so that they will still possess flow-through properties and can still be used in diesel soot filtration, with the method specified in the invention, highly stable molded bodies having considerably greater wall thicknesses can be produced. Possessing the same flow-through resistance, they are suitable for rough application conditions. This is also favorable in terms of the flow-through resistance of the deposited layer of soot. In addition, the recrystallization firing increases the abrasion resistance of the molded body and offers the further advantage that a better homogeneity of the material is achieved. This is particularly favorable in terms of electrical resistance.

The reaction and recrystallization firings can be implemented in a single flue by bringing the molded body continuously to the temperature of the recrystallization firing. It is also possible, however, for the reaction firing to be implemented, followed—preferably immediately—by the recrystallization firing. This process offers more flexibility, particularly in relation to a process that would prevent shrinkage. The reaction firing is usually implemented between 1700° and 1900° C.

The method specified in the invention can be applied particularly advantageously without the primary silicon carbide in the starting powder. The effect of the pore growth that can be achieved via the recrystallization firing, and thereby the improvement of the flow-through properties, is then most marked. If the strength and the abrasion resistance of the molded body produced in this manner are not sufficient, however, it can be advantageous to add primary silicon carbide to the starting powder in the most homogeneous distribution possible. However, in order to conserve the dies of extrusion aggregates, which are extraordinarily costly for the production of honeycombed bodies as well as the preparation, extrusion, and possible green body machining aggregates, it is recommended according to the invention that the portion of primary silicon carbide in the starting powder be limited to a maximum of 25%. This is also supported by the fact that the effect of pore growth decreases with increasing primary silicon carbide content in the starting powder. Furthermore, with the addition of primary silicon carbide, the electrical conductivity can be affected.

Carbohydrate compounds, or derivatives thereof, are particularly well-suited as binding agents. Starches, especially modified starches, have proven particularly adequate. With a high carbon yield, these provide the advantage that the carbon bridges that are formed via coking provide good binding forces in the thermal process; thus, they keep shrinkage to a minimum during coking. This promotes the flow-through properties of the finished molded body.

The binding agent may be added in a powder form during the mixing of the starting powder. It is also possible, however, to use an at room temperature liquid binding agent. The binding agent should preferably be water soluble. The quantity of binding agent used is advantageously adjusted so that all of the carbon lies in a stoichiometric relationship to the free silicon in the starting powder.

For reasons already mentioned above, an additive that serves to increase electrical conductivity should be added to the starting powder in such a quantity that the specific electrical resistance lies between $r_{min}$ and $r_{max}$, according to the above formula, specifically in the range of 0.01 to 3.0 ohm×cm. In addition, the additive should be comprised of compounds and/or elements of the third and fifth main or B-group of the periodic table. Specifically, boron compounds are well suited for this and should be added in such quantities that elemental boron is present in a quantity of 0.05 to 1.0% by weight in the starting mixture. If the additive is added in powder form, the particle size should not exceed 10 µm.

Finally, the invention provides that free silicon and/or carbon of average particle size should be used, in a range of 10 to 70 µm.

We claim:

1. A porous, flow-through molded body capable of removing diesel soot particles from diesel engine exhaust, said body comprising an alternately closed honeycombed body made of silicon carbide and having a wall thickness of 1.25±0.5 mm;

a porosity of 55 to 60%;

an average pore diameter of 25 to 70 µm; and a specific permeability of 20 to 100 nPm.

2. The molded body in accordance with claim 1, wherein a specific electrical resistance r of the molded body is set between:

$$r_{min} = \frac{P_{set}}{I_{max}^2} \times \frac{A_q}{1}, \text{ and}$$

$$r_{max} = \frac{U_{max}^2}{P_{set}} \times \frac{A_q}{1},$$

in which $P_{set}$ represents a required electrical heating capacity, $I_{max}$ represents a maximum tolerable current intensity, $U_{max}$ represents a maximum tolerable voltage, $A_q$ represents a current-carrying cross-sectional area of the molded body, and 1 represents a current-carrying length of the molded body, and in which $P_{set}$ is less than or equal to $U_{max} \times I_{max}$.

3. The molded body in accordance with claim 2, wherein the specific electrical resistance r of the molded body falls between 0.1 to 3 ohm×cm.

4. The molded body in accordance with claim 1, wherein the molded body contains elements selected from the group of elements consisting of the third and fifth main and B-group of the periodic table.

5. The molded body in accordance with claim 4, wherein the molded body contains boron in a quantity of 0.05% to 1.0% by weight.

* * * * *